(12) United States Patent
Bengoechea et al.

(10) Patent No.: US 7,187,498 B2
(45) Date of Patent: Mar. 6, 2007

(54) SURVEILLANCE WINDOW

(75) Inventors: Xavier Bengoechea, Newport Beach, CA (US); Francesco Finizio, Mission Viejo, CA (US); Richard Grich, Mission Viejo, CA (US)

(73) Assignee: Thales Avionics, Inc., Edison, NJ (US)

( * ) Notice: Subject to any disclaimer, the term of this patent is extended or adjusted under 35 U.S.C. 154(b) by 0 days.

(21) Appl. No.: 10/156,364

(22) Filed: May 28, 2002

(65) Prior Publication Data
US 2003/0095331 A1 May 22, 2003

Related U.S. Application Data

(60) Provisional application No. 60/333,398, filed on Nov. 26, 2001, provisional application No. 60/331,979, filed on Nov. 21, 2001.

(51) Int. Cl.
*G02B 27/28* (2006.01)

(52) U.S. Cl. ............ 359/501; 359/497; 396/433; 244/129.3

(58) Field of Classification Search ........ 359/454, 359/494, 839, 359; 49/168; 250/566; 313/112; 340/784; 345/87
See application file for complete search history.

(56) References Cited

U.S. PATENT DOCUMENTS

| | | | | |
|---|---|---|---|---|
| 3,544,195 A | 12/1970 | Cameron | ........ | 359/493 |
| 3,638,060 A * | 1/1972 | Wacher | ........ | 313/112 |
| 3,711,182 A | 1/1973 | Jasgur | | |
| 4,112,818 A * | 9/1978 | Garehime, Jr. | ........ | 89/41.05 |
| 4,123,141 A | 10/1978 | Schuler | ........ | 359/497 |
| 4,315,258 A * | 2/1982 | McKnight et al. | ........ | 345/87 |
| 4,719,720 A | 1/1988 | Olsen | | |
| 5,016,571 A | 5/1991 | Totaro | ........ | 119/428 |
| 5,078,470 A | 1/1992 | Milman | | |
| 5,241,380 A * | 8/1993 | Benson et al. | ........ | 348/143 |
| 5,373,863 A | 12/1994 | Prizio | | |
| 5,426,891 A | 6/1995 | Svehaug | | |
| 5,541,419 A * | 7/1996 | Arackellian | ........ | 250/566 |
| 5,585,946 A | 12/1996 | Chern | | |
| 5,609,938 A | 3/1997 | Shields | | |
| 5,825,542 A | 10/1998 | Cobb, Jr. et al. | | |
| 6,064,523 A | 5/2000 | Budd et al. | | |
| 6,133,856 A | 10/2000 | Mc Cauley | ........ | 340/936 |

(Continued)

FOREIGN PATENT DOCUMENTS

DE    33 30 382 A1    4/1985

(Continued)

OTHER PUBLICATIONS

Patent Abstracts of Japan, vol. 1996 (2) (Feb. 29, 1996) and JP 07 264448 A to Sony Corp. (Oct. 13, 1995).

*Primary Examiner*—Arnel Lavarias
(74) *Attorney, Agent, or Firm*—Drinker Biddle & Reath LLP

(57) ABSTRACT

A surveillance window including at least one set of linear polarizer and quarter-waveplate and a reflecting surface. The surveillance window appears dull and opaque to a subject, while allowing a relatively high percentage of light to be transmitted to an observer. Various enhancements including an illuminator and detector, camouflaging, fire resistance, and improvements to the opacity are also described.

8 Claims, 5 Drawing Sheets

U.S. PATENT DOCUMENTS

| | | |
|---|---|---|
| 6,182,402 B1 | 2/2001 | Aalst |
| 6,185,039 B1 | 2/2001 | Allen et al. |
| 6,204,904 B1 | 3/2001 | Tillin et al. .................. 349/119 |
| RE37,709 E * | 5/2002 | Dukek ......................... 348/148 |
| 6,449,089 B1 * | 9/2002 | Moshrefzadeh et al. .... 359/454 |
| 6,697,195 B2 * | 2/2004 | Weber et al. ................ 359/359 |
| 6,771,186 B1 * | 8/2004 | Boveja et al. ............... 340/945 |
| 6,824,317 B2 * | 11/2004 | Finizio et al. .............. 396/427 |
| 6,915,986 B2 * | 7/2005 | D'Alvia .................... 244/118.5 |

FOREIGN PATENT DOCUMENTS

| | | |
|---|---|---|
| GB | 2182969 A * | 11/1986 |

* cited by examiner

SURVEILLANCE WINDOW

CROSS-REFERENCE TO RELATED APPLICATIONS

This application claims the benefit of U.S. provisional patent application No. 60/331,979 filed Nov. 21, 2001, and U.S. provisional patent application No. 60/333,398 filed Nov. 26, 2001, both of which are incorporated by reference in their entirety.

FIELD OF THE INVENTION

The present invention relates to the design of optical devices for surveillance. In particular, it relates to a one-way optical window for covert surveillance.

BACKGROUND OF THE INVENTION

For the purpose of surveillance or reconnaissance, it is desirable for an observer to be able to see a subject without the subject being able to see the observer. The observer and subject need not be people: the observer might be a camera or other light detecting device; the subject might be anyone or anything that the observer is interested in observing.

Devices have been designed expressly for restricting light incident on them to transmission in one direction only. With an ideal device, it would be impossible for the subject to see the observer at all, while the observer would still see the subject clearly. The current state of the art presents two types of optical devices for approaching this ideal: the two-way mirror and the neutral density filter.

A two-way mirror consists of a transparent panel with reflective material that partially transmits and partially reflects light incident from the subject side, while transmitting most light incident from the observer side. Since it allows light to be transmitted from the observer to the subject, the two-way mirror is installed so that the observer is in a darker area than the subject. Under these conditions the light reflected back onto the subject overwhelms the light transmitted from the observer, allowing one-way observation.

A disadvantage to the use of two-way mirrors results from their common use in public. Two-way mirrors are so commonly used for optical surveillance that members of the general public are often suspicious of any mirrored surface in a public place. Remaining inconspicuous to a potential subject is important in the field of covert surveillance. In many cases this is impossible with a two-way mirror.

Neutral density filters are an alternative to two-way mirrors in the current state of the art. A neutral density filter consists of a combination of metals such as aluminum, nickel or chromium that have been evaporated onto a glass substrate. With different combinations of these metals, the neutral density filter can be made reflective, or absorptive. In order to avoid the previously mentioned disadvantage of reflective surfaces, the neutral density filters used in surveillance are usually made absorptive.

An absorptive neutral density filter works by absorbing a broad spectrum of incident light. As a result, the filter generally looks like a dull, opaque surface. The absorption spectrum for light transmitted through a neutral density filter, however, does not vary much with the direction in which light is transmitted. The subject appears dim or dark to the observer. Neutral density filters are used when it is very important for the observer to be inconspicuous, in which case the comparatively high optical quality of a two-way mirror is exchanged for the less noticeable alternative of a neutral density filter.

Other approaches have been proposed for covert surveillance windows. U.S. Pat. No. 6,185,039 to Allen et al. discloses an "Infrared Selective Reflective Polarizing Element" (ISRPE). The ISRPE includes two linear polarizing components, which may be rotated with respect to a common in-plane axis in order to control the amount of light transmitted. The ISRPE also includes an infrared reflective or absorptive component, for reflecting or absorbing infrared wavelength light incident to the ISRPE. Crossed-polarizers, however, must be mechanically rotated in order to control the amount of light transmitted, and do not allow covertness when in an open configuration.

U.S. Pat. No. 6,064,523 to Budd et. al discloses an "Apparatus For Polarization Conversion", whereby S polarized light may be converted to P polarized light, or vice versa. Budd et al. does not, however, disclose how such an apparatus could be used to selectively block light, for example, for use in covert surveillance.

BRIEF SUMMARY OF THE INVENTION

The present invention solves the foregoing problems by providing a surveillance window that appears dull and opaque to a subject, while allowing a relatively high percentage of light to be transmitted to an observer. The surveillance window is comprised of a linear polarizer, quarter-waveplate, and a reflecting surface. If desired, one or more linear polarizer and quarter-waveplate sets can be stacked to increase the surveillance window's apparent opacity to the subject at the expense of reducing the amount of light transmitted to the observer. In addition, protective coverings or coatings may be employed to improve the surveillance window's durability.

BRIEF DESCRIPTION OF THE DRAWINGS

The foregoing and other objects, advantages, and features of the present invention will be apparent from the following detailed description and the accompanying drawings, in which.

DETAILED DESCRIPTION OF THE INVENTION

Figure 1:
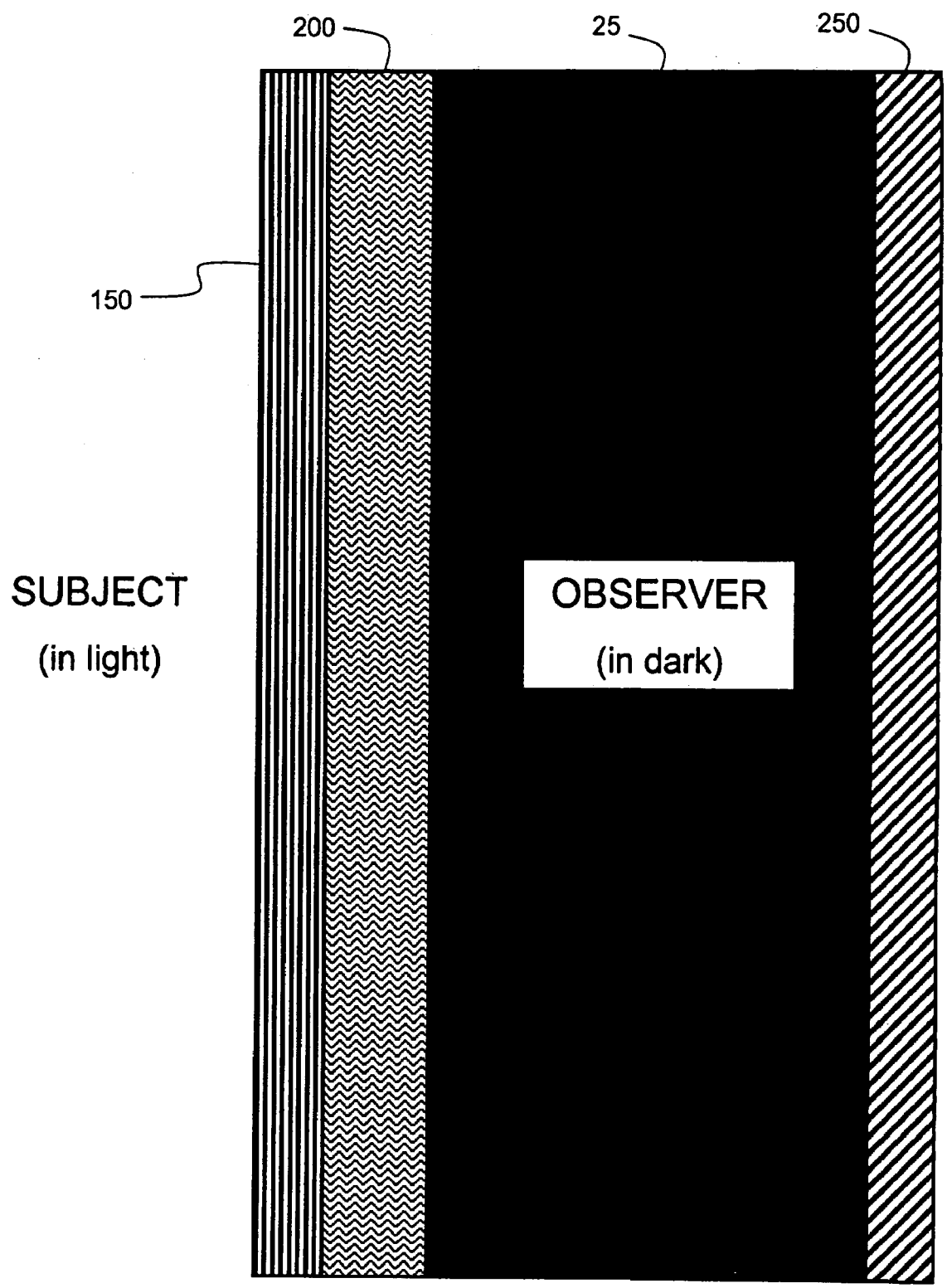
FIG. 1 is a cross-section of the orientation and layout of a surveillance window in accordance with an embodiment of the present invention.

While the present invention is susceptible to various modifications and alternative forms, certain preferred embodiments are shown by way of example in the drawings and will be described in detail herein. It should be understood, however, that it is not intended to limit the invention to the particular forms described; rather, the invention is intended to cover all modifications, alternatives, and equivalents falling within the spirit and scope of the invention defined by the appended claims.

An embodiment of the present invention is shown in cross-section in FIG. 1. On the left side is shown the subject, and on the right side the observer. As indicated in the figure, in an embodiment of the invention the observer is in an area of darkness 25 relative to the subject. The surveillance window is installed with a linear polarizer 150 facing the subject, a quarter-waveplate 200 facing the observer, and a reflecting surface 250 on the observer side. An optically clear adhesive material, such as Nitto Americas CS-9601, can be used to join the linear polarizer 150 and the quarter-waveplate 200. The wall 250 on the observer side has a smooth surface that absorbs most of the incident light, and reflects the rest. Thus, the wall 250 may be any kind of polished or black (or, preferably, both polished and black) surface. In a different embodiment, the reflecting surface or wall 250 may be a camera lens.

The present invention is comprised of a number of elements with special optical properties. By way of background, waveplates (also called retarders, wavelength retarders, or wavelength plates) are usually made of birefringent materials. Birefringent materials possess two special optical properties: first, they refract incident light into two different directions, sometimes called the slow axis and the fast axis (the two different rays are sometimes called the ordinary and the extraordinary rays); second, they restrict the light refracted in one direction to have a polarization orthogonal to the light refracted in the other direction, i.e., if the light traveling along the slow axis were polarized in the x-direction, then the light traveling along the fast axis might be polarized in the y-direction. Light traveling along the two axes recombine upon exiting the birefringent material. With the thickness of the birefringent material chosen correctly, the polarization of incident light can be shifted to any state of linear, circular, or elliptical polarization. A quarter-waveplate 200 has a thickness selected to create a phase lag between the orthogonal polarization vectors of the rays equal to one quarter of the wavelength of the incident light (90 degrees of phase lag). Linearly polarized light incident to a quarter-waveplate exits as circularly polarized light.

Figure 2:
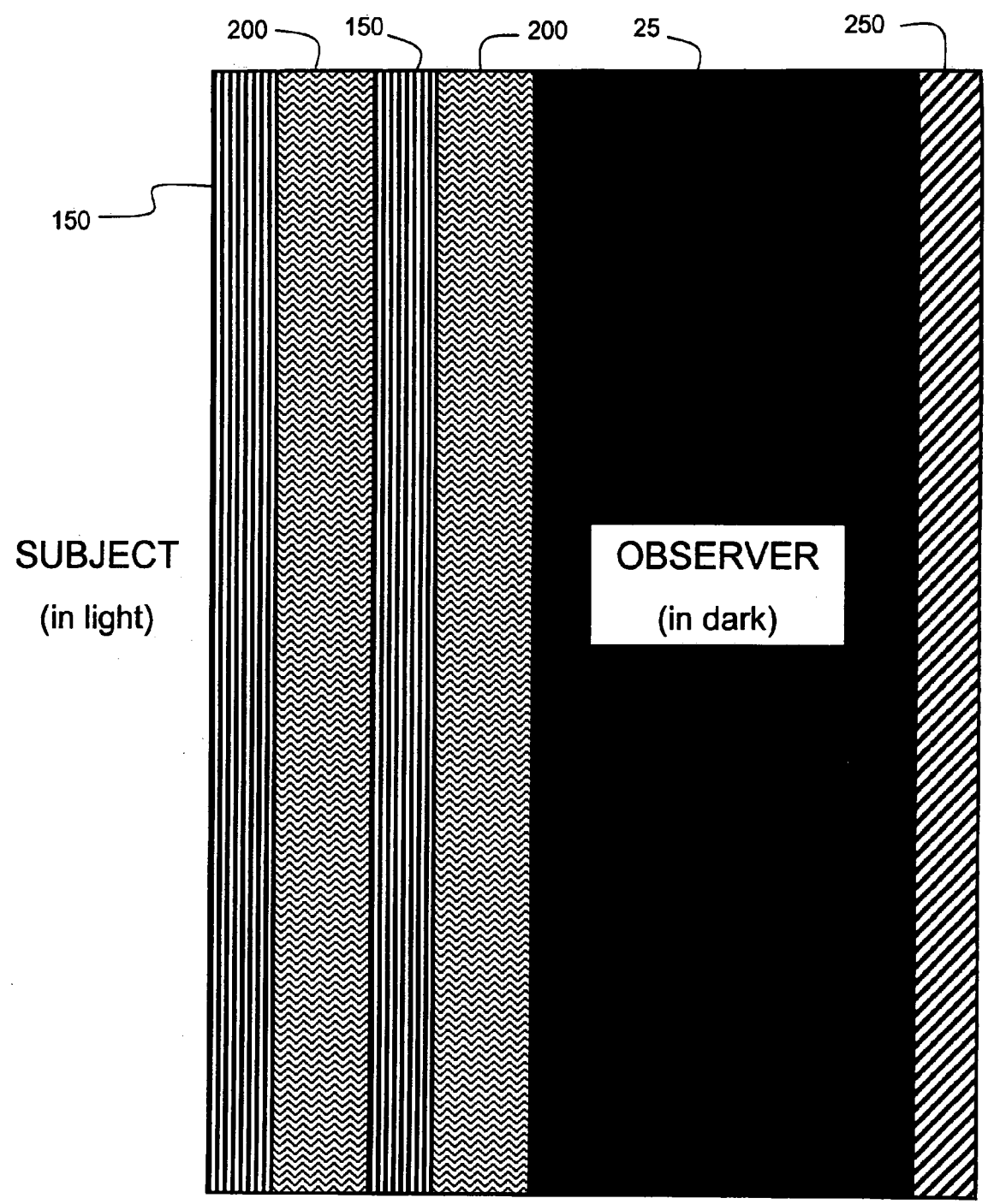
FIG. 2 is a cross-section of the orientation and layout of a thicker surveillance window in accordance with another embodiment of the present invention.

In another embodiment, shown in FIG. 2, the surveillance window might include two sets of linear polarizer 150 and quarter-waveplate 200. When more than one linear polarizer 150 and quarter-waveplate 200 set is used, the slow axes of the quarter-waveplates should be aligned parallel to each other. The effect of adding a set of linear polarizer 150 and quarter-waveplate 200 to the invention is an increase in the surveillance window's apparent opacity to the subject, and a decrease in the percentage of light transmitted to the observer. Such an embodiment might be useful in compensating for manufacturing defects in the linear polarizer or quarter-waveplate used in the invention.

The surveillance window might be made less conspicuous to a potential subject by being installed in proximity to other black objects, or by making it look like more common black objects such as clocks, phones, cabinets, appliances, desks, answering machines, computers, televisions, monitors, or printers. It might be partly covered or camouflaged with graphical art or letters, making the surveillance window look like a sign.

The surveillance window of the present invention might further comprise a two-way mirror. In this embodiment, reflections in the two-way mirror are covered by the opaque linear polarizer 150 and quarter-waveplate 200 set. The result is a more covert appearance, with the side effect of a reduced percentage of transmitted light. Alternatively, the linear polarizer 150 and quarter-waveplate 200 set might be used on the observer side of a two-way mirror. In this embodiment, the appearance of the two-way mirror is improved by providing a darker observer side, without a large reduction in the percentage of transmitted light. In yet other embodiments of the invention, one or more linear polarizer 150 and quarter-waveplate 200 sets might be used in combination with one or more neutral density filters.

The surveillance window of the present invention may be installed in a mobile environment, such as a boat, train, aircraft, or automobile. In such an environment, it is desirable to provide the window with some protection from the elements. Wind, rain, snow, and other kinds of weather may scratch or dent the surveillance window, reducing its optical quality. To prevent defects in this regard, the linear polarizer 150 and quarter-waveplate 200 set may be covered with a transparent material such as polycarbonate or glass, or coated with an optically clear coating material such as an optically clear polymer or paint. In some installations, such as in an aircraft, the transparent material will also be preferably flame-resistant, to provide some protection in the event of a fire.

The surveillance window of the present invention represents a significant improvement, especially over neutral density filters, because in an embodiment it might allow light to be transmitted from the observer to the subject. According to one embodiment of the present invention, an illuminating light (hereinafter "illuminator") of a wavelength not visible to a potential subject (e.g., infrared wavelength light) is used in conjunction with the linear polarizer 150 and quarter-waveplate 200 set to shine light on the subject from the observer side. If a detector sensitive to that wavelength of light is used, for example, a charge-coupled device (CCD), photomultiplier tube (PMT), or avalanche photodiode (APD), then an observer could detect a subject in total darkness. As long as the illuminator operates at a wavelength invisible to the subject, the illuminator's presence on the observer side does not destroy the condition of darkness relative to the subject's side as indicated in FIGS. 1 and 2. If the light on the observer's side is infrared, then a human eye cannot see it.

Figure 3:
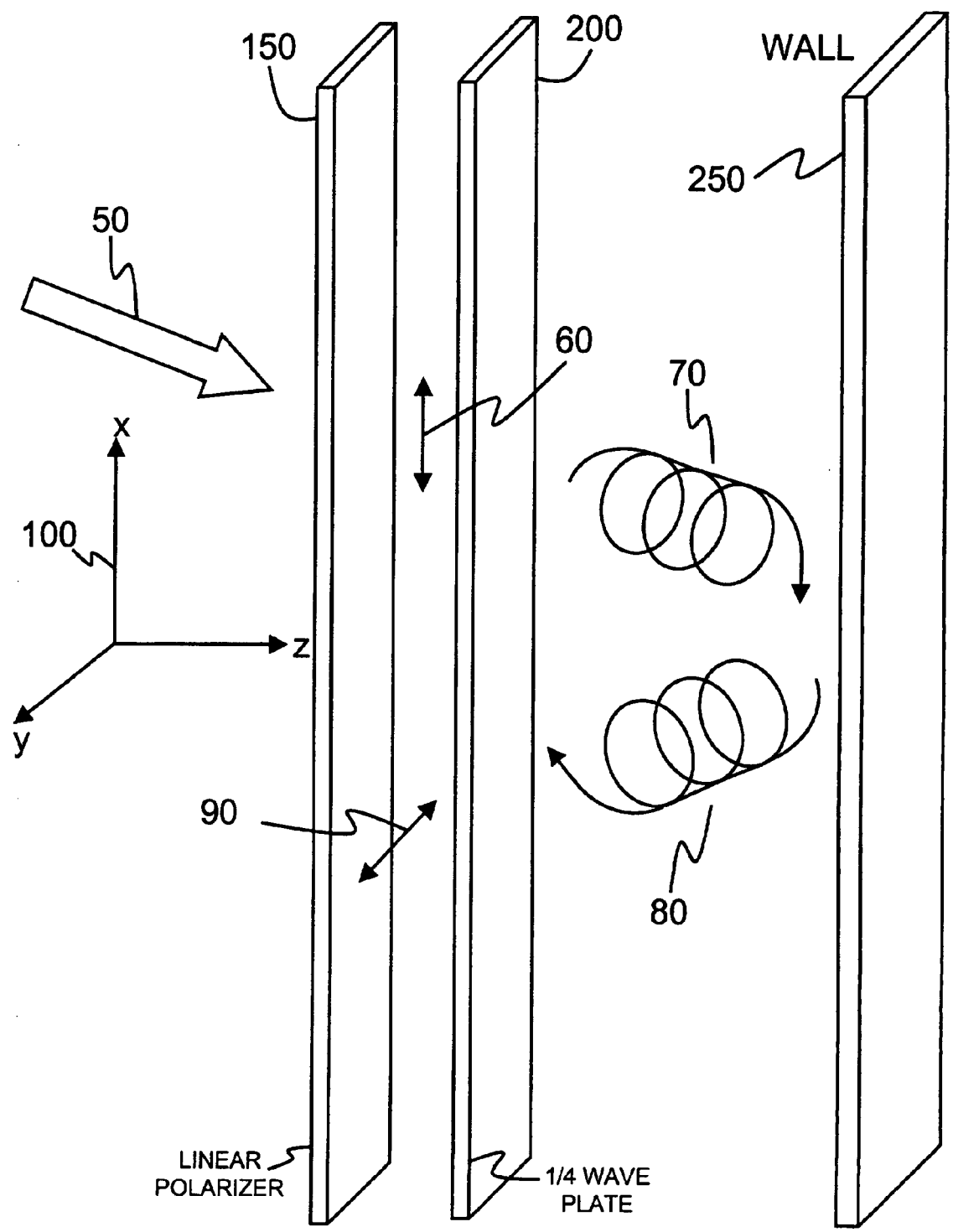
FIG. 3 is a schematic diagram illustrating the polarization of light within the surveillance window system in accordance with the present invention.

FIG. 3 provides a schematic diagram of how, in an embodiment, the present invention functions to provide a directionally specific filter for light. An explanation of the function, as illustrated in FIG. 3, requires a review of some basic mathematical definitions used in describing polarized light.

First, an arbitrary coordinate system 100 must be chosen. The coordinate system 100 contains three mutually perpendicular axes. The z-axis is perpendicular to the flat surface of the surveillance window; the x- and y-axes are chosen to be perpendicular to the z-axis—thus parallel to the surface of the surveillance window. With the three coordinate axes specified this way there is still an ambiguity in their relative orientation, namely, in the handedness of the system. FIG. 3 illustrates what is generally called a "right-handed" coordinate system 100. The system is called right-handed because if one uses a right hand thumb to specify a z-axis, a right hand index finger to specify an x-axis, and a right hand middle finger to specify a y-axis, then the fingers together would resemble (while they are kept at roughly 90 degree angles to one another) the coordinate system shown in FIG. 3.

Most commercially available light sources, e.g., fluorescent and incandescent light bulbs, produce unpolarized light. This is because the molecules in the coating of the fluorescent bulb or in the incandescent bulb filament are not directionally aligned, so the light radiated by these molecules is polarized in a plurality of directions (i.e., is unpolarized). In FIG. 3, unpolarized light, Such as might be produced by a typical fluorescent or incandescent bulb, is indicated by the block arrow 50.

For ease of illustration, the surveillance window is shown as two separate pieces (150 and 200) in FIG. 3. In practice, the two pieces are joined by an optically clear adhesive material (for example, by Nitto Americas CS-9601).

As the unpolarized light 50 enters the window, it is linearly polarized along the x-axis by the linear polarizer 150 that comprises the subject side layer of the surveillance window. The x-polarized light 60 then enters the quarter-waveplate 200, which continuously shifts the polarization until, upon exit from the quarter-waveplate 200, the light is right-hand circularly polarized 70.

Reflection off a smooth back surface 250, also labeled "WALL" in FIG. 3, flips the polarization from right-hand to left-hand circularly polarized light. Any smooth black surface parallel to the surveillance window can be used as a wall. The reflected, left-hand circularly polarized light 80, propagates back into the quarter-waveplate 200, which continuously shifts the polarization until, upon exit to the subject side of the quarter-waveplate 200, the light is y-polarized 90. Since the linear polarizer 150, as previously mentioned, is oriented to allow only x-polarized light to pass; the y-polarized light 90 is effectively eliminated by absorption into the linear polarizer 150.

In effect, the system whose function is described above will transmit about 40% of the light originating from the observer's side to the subject's side; similarly, it will transmit about 40% of the light originating from the subject's side to the observer's side. However, light that is reflected back to the observer from the subject will only have about 16% of its original intensity; and, as described above, light will not be reflected back to the subject from the observer. These figures apply to the use of a single linear polarizer and quarter-waveplate set. By adding one or more sets of linear polarizer and quarter-waveplate, the apparent opacity of the window as seen from the subject side can be increased, with a corresponding decrease in the percent of light transmitted to the observer (to about 4%). An embodiment, comprising two such sets, is shown in FIG. 2.

Figure 4:
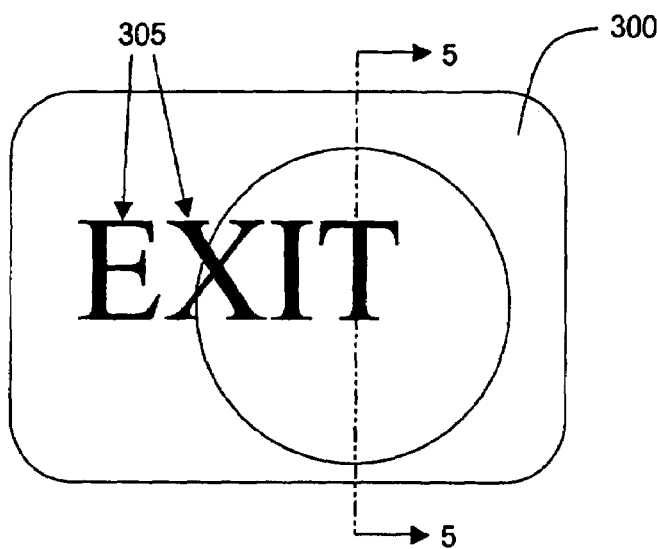
FIG. 4 is a front planar view of an embodiment of the invention for accommodating a surveillance device.
Figure 5:
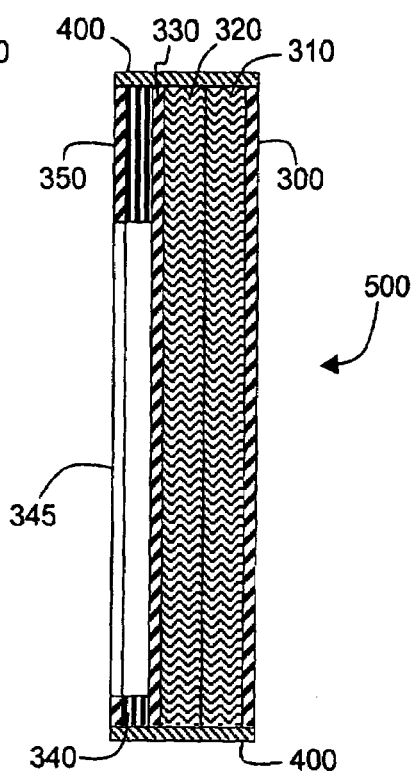
FIG. 5 is an enlarged cross sectional view of the embodiment of the invention of FIG. 4 taken at section line 5—5.
Figure 6:
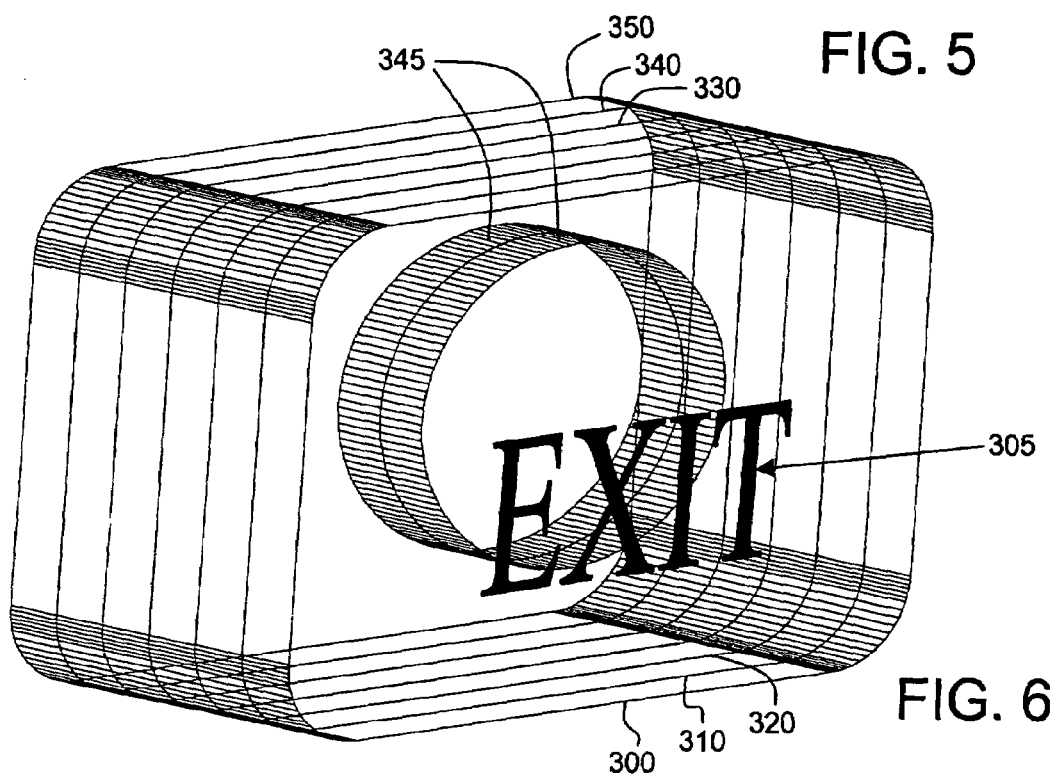
FIG. 6 is a perspective exploded view of the embodiment of the invention of FIG. 4.

Turning now to FIGS. 4, 5 and 6, there is illustrated an embodiment of the present invention that may accommodate a surveillance device such as a camera or video camera. As illustrated in FIG. 4, the surveillance window of the present invention may include lettering and may be fabricated as part of a sign mounted in an area where covert surveillance is desired, such as, for example, an entrance to a cockpit in an aircraft. The lettering may be selected to give the surveillance window the appearance of a typical sign, such as an EXIT sign, that might be mounted in the same place on the aircraft.

The surveillance window appears substantially as a flat plate, comprised of several different layers. According to one embodiment of the invention, one or more of the plates at the rear of the surveillance window may include an aperture to accommodate a surveillance device such as a camera. In the event that a surveillance device is to be mounted next to the surveillance window, the lettering and surveillance device should be arranged such that the lettering does not obscure the field of view of the surveillance device. This can be accomplished, for example, with a surveillance device having a pinpoint lens disposed adjacent or close to the surveillance window at a portion of the surveillance window where there is no lettering. Since some surveillance devices may be capable of observing both visible images and non-visible images, the surveillance window should preferably be able to transmit light of a plurality of different wavelengths. For example, if a surveillance device is used which detects infrared light and visible light, the surveillance window should not block infrared light.

Referring now primarily to FIGS. 5 and 6, the surveillance window assembly 500 may, for some applications and environments, be substantially encased in flame retardant material or plates, because typical polymer-based polarizers and waveplates are flammable. In some environments, such as within an aircraft, polymer based quarter-waveplates are preferable to quartz or calcite crystal based birefringent materials because they are lighter, less expensive and more durable. For example, use of a surveillance window mounted in an aircraft may require flame retardant encasing. The front of the surveillance window includes a front polycarbonate plate 300, which is substantially flame retardant. If the surveillance window is fabricated as part of a sign, lettering 305 may be provided on the polycarbonate plate 300. While the lettering 305 may be provided on the front or back of the polycarbonate plate 300, it may be preferred to provide the lettering 305 on the back of the plate 300 to protect the lettering 305 from deterioration. The lettering 305 may be applied by various conventional techniques, but it is preferred that the lettering 305 be very thin so as not to alter or distort the relationship of the plate 300 within the stack of plates comprising the surveillance window. In one embodiment, the lettering 305 may be provided by a very thin application such as by a silk screening process.

Provided behind the front polycarbonate plate 300 is a front circular polarizer 310. As discussed earlier herein, such a polarizer may be comprised of a quarter-waveplate and a linear polarizer plate. The linear polarizer side of the front circular polarizer 310 may be bonded to the front polycarbonate plate 300 using a very thin optically clear adhesive. Also provided is a rear circular polarizer 320 that is disposed such that the linear polarizer side is adjacent to the quarter-waveplate side (retarder side) of the front circular polarizer 310, and the slow axes of the quarter-waveplate sides (retarder sides) of the front circular polarizer 310 and the rear circular polarizer 320 are parallel. The rear circular polarizer 320 may be bonded to the front circular polarizer 310 using a very thin optically clear adhesive. A rear polycarbonate plate 330, which is preferably flame retardant, may be provided behind the rear circular polarizer 320 and may be bonded to the circular polarizer 320 using a very thin optically clear adhesive. In order to provide greater structural support and to provide alignment to accommodate a surveillance device such as a camera, an aluminum plate 340 may be provided behind the rear polycarbonate plate 330. The aluminum plate 340 may preferably be relatively thin and fabricated from black anodized aluminum. In addition, the plate 340 may be fabricated to have an aperture 345, such as a circular shaped aperture 345 as illustrated, to accommodate and provide alignment for a surveillance device such as a camera or at least the front part of a lens assembly of such a surveillance device. The aluminum plate 340 may be bonded to the rear polycarbonate plate 330 using a high performance acrylic adhesive. In order to mount the surveillance window assembly on a wall, or other surface, there may be provided a double sided adhesive tape 350 which attaches on one side to the aluminum plate 340 and on the other side to a surface (not shown) onto which the surveillance window assembly may be mounted. Finally, there may be provided a silicone epoxy seal 400 around all the edges of the assembly. Preferably, the silicone epoxy seal 400 is flame retardant.

As should be apparent, the surveillance window assembly 500 illustrated in FIGS. 4, 5 and 6, is assembled such that the circular polarizers 310 and 320, which are known to typically be flammable, are encased within flame retardant materials comprising, for example, a front polycarbonate plate 300, a rear polycarbonate plate 330 and a silicone epoxy seal 400 around the edges of the assembly. Such an arrangement provides a relatively flame retardant assembly which otherwise might be relatively flammable because of the flammable circular polarizers.

Figure 7:
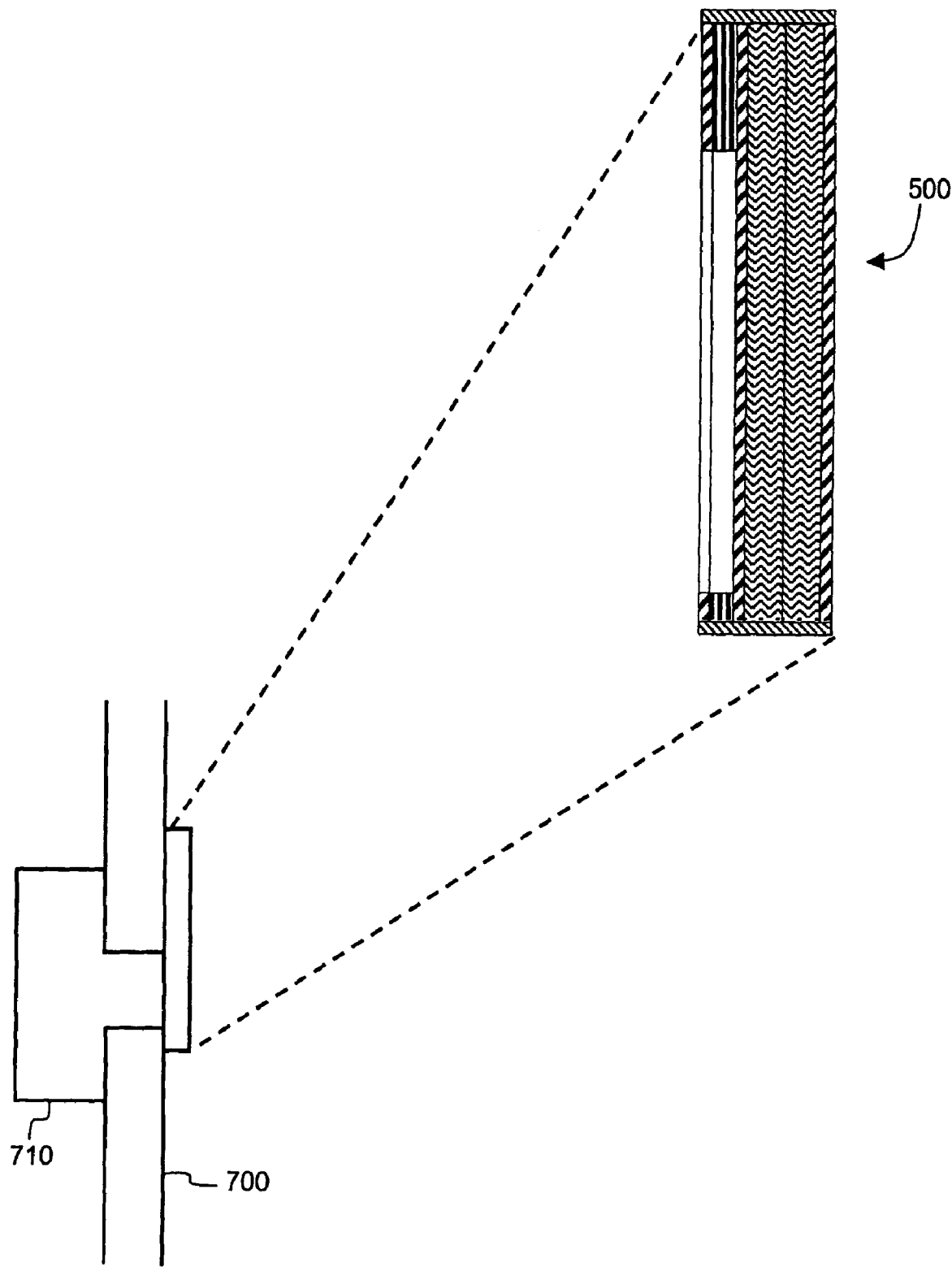
FIG. 7 is a view of the present invention illustrating the manner in which it might be installed for a covert surveillance application.

Turning now to FIG. 7, there is illustrated the manner in which the surveillance window assembly 500 of the present invention may be mounted in an environment for covert surveillance. The surveillance window assembly 500 of the present invention, for example, as described in connection with FIGS. 4, 5 and 6, may be mounted on a wall 700 or other surface. The surveillance window assembly may be mounted on the header above the door of a cockpit in an aircraft. In order to accommodate a surveillance device, such as a camera, from the observer side, the surveillance window is mounted over an aperture in the wall or surface. Mounted on the other side of the wall and extending through the aperture of the wall may be a surveillance device 710, such as a camera or video camera. In such an arrangement, the camera side of the wall may be considered as the observer side and the other side may be considered as the subject side. The surveillance device may observe objects, individuals and activities on the subject side of the window, while the presence of the surveillance device remains substantially covert on the observer side of the window because of the one-way properties of the surveillance window of the present invention.

It should be understood that various changes and modifications to the presently preferred embodiments described herein would be apparent to those skilled in the art. Such changes and modifications may be made without departing from the spirit and scope of the present invention and without diminishing its attendant advantages.

What is claimed is:

1. An aircraft surveillance system comprising:
   a wall separating a cockpit of an aircraft from the cabin of the aircraft;
   a cockpit door disposed within an opening within the wall, the wall having an aperture located proximate to the cockpit door;
   a window disposed within the aperture;
   a camera disposed on the cockpit side of the wall in a position adjacent to the window so as to receive light that passes through the window;
   the window comprising:
      a first circular polarizer having a linear polarizer side and a quarter-waveplate side, the linear polarizer side facing the cabin, the quarter-waveplate side facing the cockpit;
      a second circular polarizer attached to the first circular polarizer, the second circular polarizer having a linear polarizer side and a quarter-waveplate side, the linear polarizer side facing the quarter-waveplate side of the first circular polarizer, the quarter-waveplate side being oriented toward the cockpit,
   the camera being located between the cockpit and the second circular polarizer.

2. The system of claim 1, wherein the first and second circular polarizers are attached to one another with a layer of adhesive.

3. The system of claim 1, further comprising a flame retardant plate attached to the first circular polarizer on its linear polarizer side.

4. The system of claim 1, further comprising a flame retardant plate attached to the second circular polarizer on its quarter-waveplate side.

5. The system of claim 1, further comprising a first flame retardant plate attached to the linear polarizer side of the first circular polarizer and a second flame retardant plate attached to the quarter-waveplate side of the second circular polarizer.

6. The system of claim 1, further comprising a plate attached to the window on the side of the window facing the cockpit, the plate having an aperture, wherein the camera extends through the aperture.

7. The system of claim 1, further comprising a first polycarbonate plate attached to the linear polarizer side of the first circular polarizer and a second polycarbonate plate attached to the quarter-waveplate side of the second circular polarizer.

8. An aircraft surveillance system comprising:
   a wall separating a cockpit of an aircraft from the cabin of the aircraft;
   a cockpit door disposed within an opening within the wall, the wall having an aperture located proximate to the cockpit door;
   a window disposed within the aperture;
   a camera disposed on the cockpit side of the wall in a position adjacent to the window so as to receive light that, passes through the window; and
   the window comprising:
      a first circular polarizing means having a linear polarizer side and a quarter-waveplate side, the linear polarizer side facing the cabin, the quarter-waveplate side facing the cockpit;
      a second circular polarizing means attached to the first circular polarizing means, the second circular polarizing means, having a linear polarizer side and a quarter-waveplate side, the linear polarizer side facing the quarter-waveplate side of the first circular polarizing means, the quarter-waveplate side being oriented toward the cockpit,
   the camera being located between the cockpit and the second circular polarizing means.

* * * * *